United States Patent [19]

McDonald

[11] Patent Number: 4,890,928
[45] Date of Patent: Jan. 2, 1990

[54] METERING DEVICE FOR SOFT ICE CREAM FREEZERS

[76] Inventor: John L. McDonald, P.O. Box 338, Eclectic, Ala. 36024

[21] Appl. No.: 269,709

[22] Filed: Nov. 10, 1988

[51] Int. Cl.$^4$ .............................................. B01F 13/02
[52] U.S. Cl. .................................... 366/101; 251/207; 366/150
[58] Field of Search ............... 366/101, 150, 336, 337, 366/340, 348, 349, 107; 251/207; 62/135; 99/323.1

[56] References Cited

U.S. PATENT DOCUMENTS

| | | | |
|---|---|---|---|
| 3,115,896 | 12/1963 | Roberts | 251/207 |
| 3,132,428 | 5/1964 | Haissig | 251/207 |
| 3,898,858 | 8/1975 | Erickson | 62/135 |
| 4,553,423 | 11/1985 | Tanimoto | 251/207 |
| 4,735,133 | 4/1988 | Paoletti | 366/101 |

*Primary Examiner*—Robert W. Jenkins
*Attorney, Agent, or Firm*—Richard C. Litman

[57] ABSTRACT

The discharge bore of a liquid ice cream reservoir supports a metering device extending into it. Liquid mix flows from the reservoir through an orifice in the metering device into an inner bore. Suction created by the liquid flow draws air into the inner bore through an air metering orifice where it mixes with the liquid, the mixture then flowing by gravity to the freezer barrel. An inner valve body within the metering device contains a plurality of metering orifices of incrementally increasing sizes which can be selectively aligned with a a discharge orifice to control the flow rate of the liquid. Indicia on the valve body provide a visual indication of the orifice selected.

4 Claims, 1 Drawing Sheet

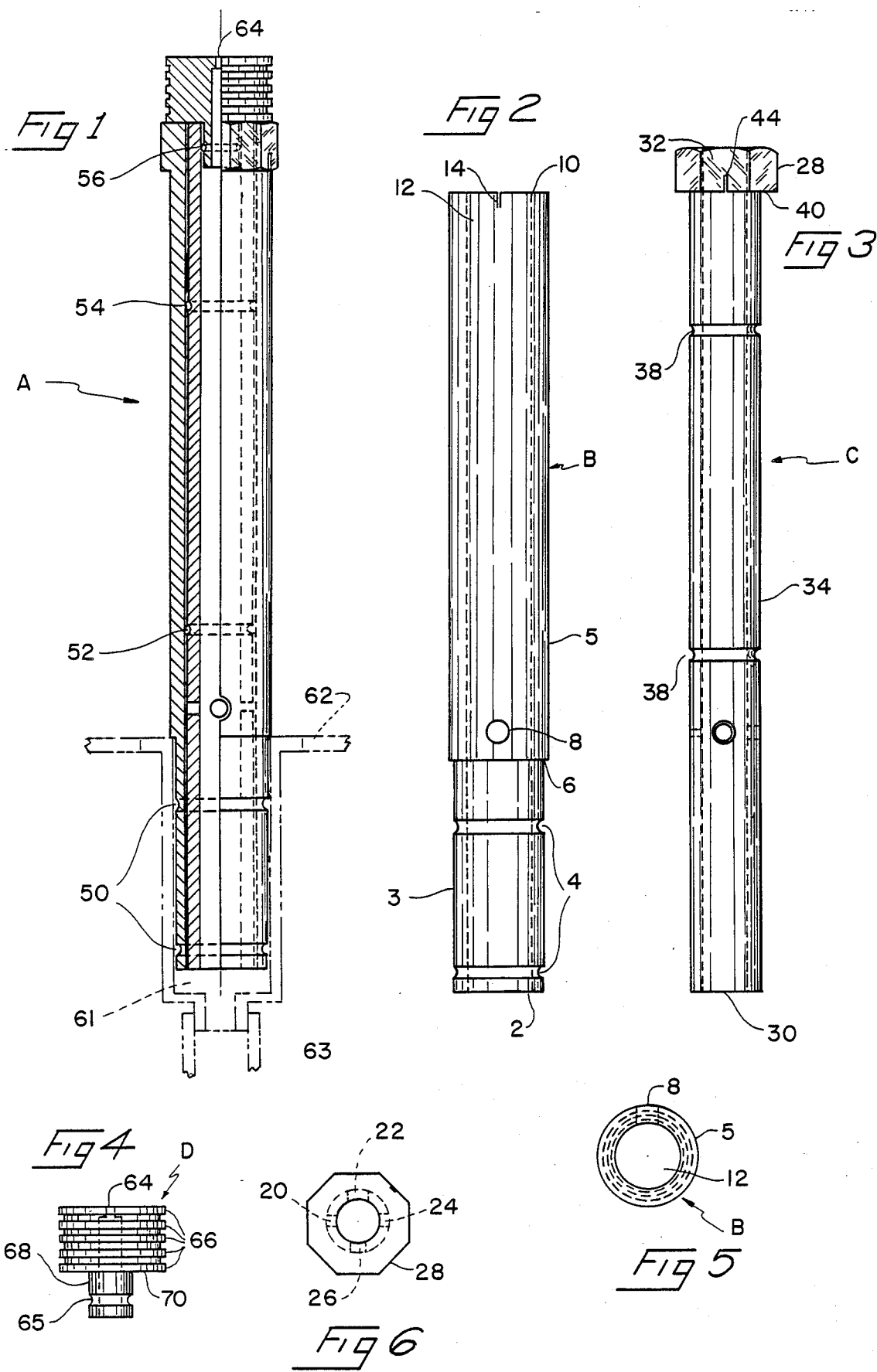

METERING DEVICE FOR SOFT ICE CREAM FREEZERS

FIELD OF THE INVENTION

This invention relates to a metering device for gravity-fed soft ice cream freezers in which a mixture of liquid ice cream and air is metered and mixed together before passing to the freezing chamber.

PRIOR ART

Soft-serve freezers of the type which feed air and liquid ice cream mix to the freezer barrel by gravity means are provided with a reservoir which holds a supply of liquid mix at an elevation higher than the barrel, communicating with it through a pipe conduit. A metering device, generally of an elongated cylindrical shape, is mounted inside the reservoir connected to the discharge line to the freezer and has air and fluid metering orifices through which these fluids are metered into its interior mixing chamber, from which it flows to the freezer barrel.

The actual amount of aerated mix required per hour varies considerably with demand. The freezer may be required to run at full capacity at one time of the day and sit idle at others. Demand may be very high on weekends while dropping to almost nothing during the week.

This wide range of demand taxes the operation of conventional mixers, which have relatively small ranges of flow. The combination of a single air orifice and single fluid nozzle is normally selected to provide an optimum air and liquid mix when the freezer is operating at its maximum capacity. As demand slows, the flow of air and liquid into the mixing device slows. When this occurs, the ratio of air to liquid mix flowing into the mixing device changes, affecting the composition of the mix and its taste.

Apparatus to overcome this deficiency and provide a wider operating range by means of maintaining a constant fluid pressure have been disclosed, wherein the fluid pressure is maintained constant by a float control within the fluid. U.S. Pat. No. 3,898,858 to Erickson issued Aug. 12, 1975 discloses such a device, wherein the fluid flows into an orifice in a discharge tube, the orifice distance below the fluid surface being held constant by floating the discharge tube on the fluid.

Another apparatus which regulates fluid flow and mixes in air, comprises a cylindrical elongated tube mounted vertically with its lower end communicating with the opening to the feed pipe which supplies fluid from the reservoir to the freezer. An orifice near the base of the tube communicates with the fluid, allowing a metered flow to enter the cylinder from the reservoir. The vacuum created within this cylinder by the fluid flow also serves to draw air into the cylinder through an air orifice in the upper end of the cylinder, wherein it mixes with the liquid mix.

SUMMARY OF THE INVENTION

The primary objective of this invention is to provide apparatus for aerating liquid ice cream mix which can be operated while installed in the liquid ice cream reservoir, without requiring removal and replacement.

Another object is to provide means for selecting the rate of flow of the liquid mix from the reservoir into the apparatus, the selection to be made by the operator.

A further object is to provide means for closing off the flow of liquid mix from the reservoir, under control of the operator.

A still further object is to provide means to select the flow of air injected into the liquid mix without removing and replacing the aerating apparatus.

When these and other objects in view which will more readily appear as the nature of the invention is better understood, the invention consists in the novel construction, combination and assembly hereinafter more fully illustrated, described and claimed, with reference being made to the accompanying drawings wherein, similar reference characters designate corresponding components throughout the several views of drawings.

BRIEF DESCRIPTION OF THE DRAWINGS

FIG. 1 is a vertical view, partly in section, of the metering device;

FIG. 2 is a side elevational view of the cylindrical housing;

FIG. 3 is a side elevational view of the valve body;

FIG. 4 is a side elevational view of the plug;

FIG. 5 is a plan view of the upper end of the cylindrical housing of FIG. 2; and FIG. 6 is a top plan view of the upper end of the valve body of FIG. 3.

DESCRIPTION OF THE PREFERRED EMBODIMENT

The present invention is particularly directed to metering the fluid ice cream mix and injected air which comprise the ingredients of soft freeze ice cream. In gravity-fed machines, fluid mix is contained in a reservoir and is gravity-fed to a freezer barrel in which the mixture of fluid mix and air is frozen and from which the frozen product is subsequently dispensed. Control of the flow of the aerated fluid is effected by metering the air and fluid through orifices into a mixing chamber from which the mixture flows to the freezer barrel.

Referring now to the drawings, there is illustrated a metering device A comprising a cylindrical housing B, a valve body C and plug D, with the body C, housing B and plug D being provided with sealing rings 50, 52, 54 and 56. Housing B comprises an elongated hollow body having first end 2 and second end 10. Cylinder section 3 adjacent first end 2 has an outside diameter less than outer wall 5, to slidably extend into the inside bore of the mixture discharge port 61 of the fluid reservoir 62. Shoulder 6 serves to limit the entry of section 3 into port 61. Sealing rings 50 in circumferential grooves 4 serve to prevent leaks from the fluid reservoir 62. Fluid inlet 8 communicates between the fluid reservoir interior and internal bore 12. The diameter of internal bore 12 is slightly larger than the diameter of outer wall 34.

Circular valve body C fits tightly but movably within internal bore 12, with shoulder 40 abutting second end 10 and first end 30 of valve body C flush with first end 2 of cylindrical housing B. Metering orifices 20, 22, 24 and 26 are uniformly distributed circumferentially around outer wall 34 in a perpendicular plane, each orifice of a different size corresponding to a different liquid flow rate. Sealing rings 52 and 54 in circumferential grooves 38 block liquid leakage between valve body C and internal bore 12.

Plug D is provided with a cylindrical section 68 which extends into inner bore 32. Shoulder 70 abuts second end 42 to limit the extension of section 68 into bore 32 when plug D is in place. Leakage is prevented by sealing ring 56, mounted in circumferential groove 65. Metering orifice 64 is sized to meter air at a prescribed rate, the orifice 64 communicating with inner bore 60.

To operate metering device A, the device is first installed in fluid reservoir 62 by sliding cylindrical section 3 into inner bore 61 until it abuts shoulder 6. Valve body C is now inserted into inner bore 12 until shoulder 40 rests on second end 10. Plug D is now installed by inserting cylindrical section 68 into inner bore 60 until shoulder 32 rests on second end 42.

Liquid mix flow rate is now set by turning valve body C to align a metering orifice 20, 22, 24, 26 with fluid inlet 8. The orifice selected is indicated by the alignment of indicia 44 with the indication mark 14. Turning the valve body C to a position between two orifices obstructs the liquid inlet 8, preventing liquid flow.

The reservoir is filled with liquid mix to the desired level and the valve body C turned to select the metering orifice 20, 22, 24, 26 corresponding to the desired flow rate. Fluid mix flows by gravity means into inner bore 32, into inner bore 61 and thence into feed line 63 wherein it is conveyed to the freezer. The flowing action creates a vacuum within inner bore 32, which acts to such air inward through air metering orifice 64.

As orifice diameter affects the ratio of liquid mix to air, the orifice is readily changed by removing plug D and substituting one with a larger or smaller orifice. Circumferential ridges 66 provide an improved grip for installing and removing the plug.

Cleaning is accomplished by removing and disassembling the metering device A, cleaning the individual parts and reassembling and replacing them under hygienic conditions.

While I have illustrated and described the preferred form of construction for carrying my invention into effect, this is capable of variation and modification without departing from the spirit of the invention. I therefore do not wish to be limited to the precise details of construction as set forth, but desire to avail myself of such variations and modifications as come within the scope of the appended claims.

I claim:

1. A metering valve for a soft ice cream freezer comprising:

a hollow exterior housing adapted for insertion in the discharge port of a liquid mix reservoir;

a port adjacent the reservoir bottom communicating with the reservoir interior and the hollow interior of the exterior housing;

an upper end with an adjacent indicia mark;

an inner hollow cylindrical valve body slidably fitted within the hollow interior of the exterior housing and having a lower end in the same plane as the exterior housing lower end;

an upper end having an adjacent faceted tool-engaging section;

indicia on the facets adjacent the indicia mark on the exterior housing;

a plurality of metering orifices in a plane perpendicular to the valve body axis and communicating with its inner bore and the hollow interior of the exterior housing, whereby the alignment of a single metering orifice with the bore in the outer housing provides communication with the reservoir interior, and rotation of the inner body by tool-engaging means alternately aligns a selected aperture or a closed space between apertures with the bore; and the upper end of the valve body including a removable plug having an inner concentric bore and air orifice, said orifice communicating with the fluid reservoir and the valve body interior.

2. The apparatus of claim 1 having circumferential sealing means on the cylindrical section of the exterior housing in order to:

retain the housing in place by friction means; and seal the space between the housing and the discharge port of the reservoir.

3. The apparatus of claim 1, having circumferential sealing means on the outer wall of the valve body in order to:

retain the valve body in place within the hollow interior of the outer housing; and seal the space between the valve body outer wall and the outer housing inner wall by sliding circumferentially against said wall.

4. The apparatus of claim 1 wherein:

said plug has circumferential sealing means on the outer lesser diameter cylindrical wall to frictionally retain the plug in place in order to prevent leaks between the plug and the inner valve body.

* * * * *